(12) United States Patent
Ortiz et al.

(10) Patent No.: US 7,760,585 B1
(45) Date of Patent: Jul. 20, 2010

(54) THROUGH THE BULKHEAD REPEATER

(75) Inventors: Albert Ortiz, Chalfont, PA (US);
Donald Dalessandro, Williamstown, NJ (US); Qing Dong, Birdsboro, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 466 days.

(21) Appl. No.: 11/906,800

(22) Filed: Jul. 26, 2007

(51) Int. Cl.
*H04B 3/36* (2006.01)
(52) U.S. Cl. .......................................... 367/2
(58) Field of Classification Search ............ 367/2, 367/82, 128; 455/7, 3.06
See application file for complete search history.

(56) References Cited

U.S. PATENT DOCUMENTS

| | | | |
|---|---|---|---|
| 5,437,058 | A | 7/1995 | Grosz et al. |
| 6,483,865 | B1 | 11/2002 | Beierle |
| 6,823,810 | B2 | 11/2004 | Carlson et al. |

OTHER PUBLICATIONS

Graham et al.; Metallic Structures Using Electromagnetic Acoustic Transducers; May 2009; IEEE; 6 pages.*

* cited by examiner

*Primary Examiner*—Dan Pihulic
(74) *Attorney, Agent, or Firm*—Dave A. Ghatt

(57) ABSTRACT

A method and apparatus for transmitting radio frequency signals and associated information through a plurality of compartments and associated bulkhead walls in a water vessel. The method and apparatus includes a through-the-bulkhead repeater system, in which one or more bi-directional repeater units are mounted on bulkhead walls in each compartment. The bi-directional units communicate with each other to transfer signals throughout the vessel. In operation, a bi-directional unit converts radio frequency signals into energy forms such as ultrasonic waves, which are propagated from one compartment to an adjacent compartment through the thick bulkhead walls. The propagated energy forms are received in the adjacent compartment by another bi-directional unit, which eventually converts the energy form into an output radio frequency signal, which is then transmitted by the bi-directional unit.

20 Claims, 5 Drawing Sheets

THROUGH THE BULKHEAD REPEATER

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The present invention relates generally to an arrangement for providing wireless communication in a vessel, more particularly the invention is directed to the use of repeater arrangement for providing wireless communication capable of transmission through thick-walled bulkheads and compartments on marine vessels.

BACKGROUND

Surface and subsurface water vehicles are used in a variety of naval and civilian activities. These vehicles, such as ships, typically include bulkhead structures that divide functional areas into sections, and also provide structural support for the vehicle. These sections may be used as watertight compartments that can contain water in instances where there is a leak or some sort of hull breach. The sections may also be used as fireproofed compartments for preventing the spread of smoke and fire. In order to provide these safety functions, the compartments typically comprise thick steel walls.

Wireless communication provides the capability of reconfiguring critical control system information for mission essential tasks. However, radio frequency signals have great difficulty in penetrating the steel walls of ships. The compartmentalized steel bulkhead structure is an excellent conductor, and when an electric field enters such a conductor, it collapses entirely and is severely attenuated. It is desired to have wireless communications arrangements that accommodate for the thick compartment walls and properly transmit radio frequency signals through the bulkhead. It is further desired to overcome this problem without physical penetration of the bulkhead, because physical penetration leads to the weakening of the reinforcement as well as increased labor costs.

SUMMARY

Disclosed are various systems for transmitting radio frequency signals through bulkheads situated in water transportation vessels.

In one aspect, the invention is a through the bulkhead repeater arrangement. The arrangement includes at least one bulkhead wall having a first side and a second side. The invention further includes a first bi-directional unit associated with the first side of the bulkhead wall for receiving a radio frequency signal. According to this aspect, the first bi-directional unit comprises, a first antenna, and a first transceiver electrically attached to the first antenna, wherein the first transceiver receives radio frequency signals via the first antenna. The first bi-directional unit also includes a first bi-directional converter, electrically attached to the first transceiver, wherein the first bi-directional converter converts radio frequency signals sent by the first transceiver into electronic signals. The first bi-directional unit further includes a first bi-directional transducer electrically attached to the first bi-directional converter. The first bi-directional transducer receives the electronic signals from the first bi-directional converter and converts the electronic signals into an energy form. The first bi-directional transducer also propagates the energy form through the bulkhead wall from the first side of the bulkhead wall to the second side of the bulkhead wall, using the bulkhead wall as a conductor. According to this aspect, the through the bulkhead repeater arrangement further includes a second bi-directional unit associated with the second side of the bulkhead wall for transmitting a radio frequency signal. The second bi-directional unit comprises a second bi-directional transducer that receives the energy form, and converts the energy form into electronic signals. The second bi-directional unit further includes a second bi-directional converter electrically connected to the second bi-directional transducer, wherein the second bi-directional converter receives the electronic signals from the second bi-directional transducer. The second bi-directional converter also converts the electronic signals into radio frequency signals. In this aspect, the second bi-directional unit further includes a second transceiver having a second antenna, the second transceiver electrically attached to the second bi-directional converter. According to this aspect the second transceiver receives the radio frequency signals from the second bi-directional converter, and transmits the radio frequency signals via the second antenna.

In another aspect, the invention is a water vessel bulkhead repeater system for transmitting radio frequency signals throughout the water vessel. The system comprises a vessel hull having a plurality of bulkhead compartments, each compartment arranged adjacent to at least one other compartment. In this aspect, each compartment comprises a plurality of bulkhead walls with one or more of the plurality of bulkhead walls separating adjacent compartments from each other. Each bulkhead wall has two opposing sides. In this aspect, each compartment comprises at least one bi-directional unit mounted on a side of a bulkhead wall within the compartment, the at least one bi-directional unit having, an antenna, and a transceiver electrically connected to the antenna. The transceiver is equipped to receive incoming radio frequency signals via the antenna. The at least one bi-directional unit also includes a bi-directional converter electrically attached to the transceiver, with the bi-directional converter designed to receive incoming radio frequency signals from the transceiver and for converting the radio frequency signals into electronic signals. In this aspect, the at least one bi-directional unit further includes a bi-directional transducer electrically connected to the bi-directional converter for receiving the electronic signals from the bi-directional transducer, and for converting the signals to an energy form. According to the invention, the bi-directional transducer propagates the energy form through the bulkhead wall to an adjacent bulkhead compartment.

In another aspect, the invention is a method of transmitting radio frequency signals throughout a water vessel. In this aspect, the water vessel includes a vessel hull having a plurality of bulkhead compartments. Each compartment is arranged adjacent to at least one other compartment, and each compartment comprises a plurality of bulkhead walls with one or more of the plurality of bulkhead walls separating adjacent compartments from each other. In this aspect, each bulkhead wall has opposite sides located in adjacent compartments. In this aspect, the method includes: (a) capturing an incoming radio frequency signal in a first compartment of one of the compartments; (b) converting the radio frequency signal into an electronic signal; (c) converting the electronic signal into an energy form; (d) transmitting the energy form from the first compartment into an adjacent compartment by propagating the energy form through the bulkhead wall; (e) receiving the energy form at the opposite side of the bulkhead wall in the adjacent compartment; (f) converting the energy form into an electronic signal; (g) converting the electronic signal into an output radio frequency signal; and (h) transmitting the output radio frequency signal.

BRIEF DESCRIPTION OF THE DRAWINGS

Other features will be apparent from the description, the drawings, and the claims.

DETAILED DESCRIPTION

Figure 1:
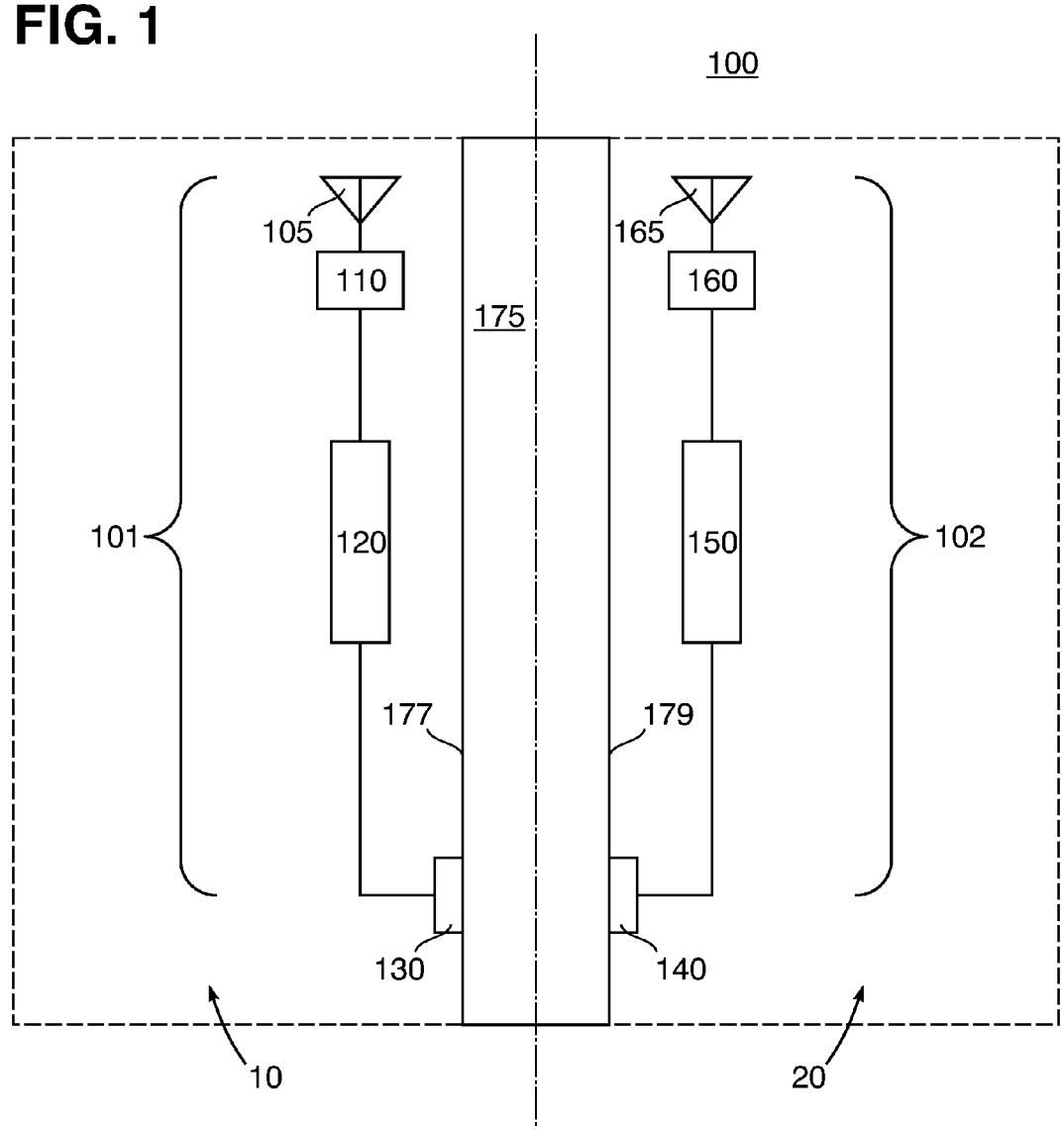
FIG. 1 is a perspective view of a through-the-bulkhead repeater arrangement according to an embodiment of the invention.

FIG. 1 is a perspective view of a bi-directional through-the-bulkhead repeater arrangement 100 according to an embodiment of the invention. The repeater arrangement 100 is provided to transmit radio frequency signals, and information carried by the radio frequency signals, through different bulkhead compartments in a water vessel, the bulkhead compartments separated by bulkhead walls. The repeater arrangement 100 is located on either side of a bulkhead wall 175, the bulkhead wall having a first side 177 in a first compartment 10 and a second side 179 in a second compartment 20. The bulkhead wall 175 is typically thick walled and may comprise a metal such as steel, but other materials may also be used. As shown in FIG. 1, arrangement 100 comprises a first bi-directional unit 101 and a second bi-directional unit 102. The first bi-directional unit is associated with the first side 177 of the bulkhead wall, and is located in the first compartment 10. The first bi-directional unit 101 includes a transceiver 110, and an antenna 105 associated with the transceiver 110. The antenna 105 may comprise one or more antennae elements for sending and receiving radio frequency signals. The first bi-directional unit further includes a bi-directional converter 120 and a bi-directional transducer 130. The elements of the first bi-directional unit 101 may be hard-wired and packaged as a single device on an integrated circuit board or the like. The unit 101 is preferably mounted on the first side 177 of the bulkhead wall 175, and may be attached to the wall by means of adhesives, suction devices, magnetic devices, or other known non-invasive attaching means. Alternatively, the unit 101 may be attached to the wall by invasive means such as screws, bolts, and the like.

As shown in FIG. 1, in the arrangement 100, the second bi-directional unit 102 is associated with the second side 179 of the bulkhead wall 175, and located in the second compartment 20. The structure of the second bi-directional unit 102 is similar to that of the first bi-directional unit 101. The second bi-directional unit 102 includes a transceiver 160, and an antenna 165 associated with the transceiver 165, a bi-directional converter 150, and a bi-directional transducer 140. Similar to the first unit 101, the elements of the second bi-directional unit 102 may be hard-wired and packaged as a single device on an integrated circuit board or the like. The unit 102 is preferably mounted on the second side 179 of the bulkhead wall 175, and may be attached to the wall by means of adhesives, suction devices, magnetic devices, or other known non-invasive attaching means. Alternatively, the unit 102 may be attached to the wall by invasive means such as screws, bolts, and the like.

According to an exemplary operation of the above described apparatus, a radio frequency signal is received by the first bi-directional unit 101, converted to an energy form, and that energy form is propagated through the bulkhead wall from the first side of the wall. The second bi-directional unit receives the energy form on the second side of the wall, the energy form eventually converted into a corresponding radio frequency signal. This allows information associated with the initial radio frequency signal to be transmitted through the wall.

In operation, the transceiver 110 of the first bi-directional unit 101 receives an incoming radio frequency signal via the antenna 105. The transceiver 110 then sends the radio frequency signal to the bi-directional converter 120, which converts the radio frequency signal into an electronic signal. The electronic signal is preferably an acoustic signal such as an ultrasonic signal. If an ultrasonic signal is desired, a signal processor such as a voltage controlled oscillator having a fixed carrier frequency set in a specified ultrasonic range may be incorporated in the bi-directional converter. The electronic signal may also be a magnetic signal such as an electromagnetic signal. The electronic signal is then fed to the bi-directional transducer 130, and is converted by the transducer into an energy form that is conducted through the bulkhead wall 175. In one particular embodiment, if the electronic signal is an acoustic signal, the transducer 130 converts this signal into an acoustic wave which it transmits through the bulkhead wall 175, the wall acting as a conductor, conducting the signal from the first side 177 to the second side 179. The acoustic wave may be an ultrasonic wave that is propagated through the bulkhead wall. Ultrasonic waves in the range of 20 Kilohertz to about 1000 Kilohertz may be applicable for solid steel bulkhead walls. In another embodiment, if the electronic signal is a magnetic signal, the transducer 130 converts magnetic signal into a magnetic wave that is propagated through the bulkhead wall 175.

According to the exemplary operation, the bi-directional transducer 140 of the second bi-directional unit located in the second compartment senses the energy form that is propagated through the wall 175. Transducer 140 then converts the energy form into an electronic signal and sends the electronic signal to the bi-directional converter 150. As stated above, the energy form may be an acoustic wave such as ultrasonic wave, or a magnetic wave. The electronic signal may be an acoustic signal such as an ultrasonic signal or may be a magnetic signal. In the instance when the energy form is an acoustic wave, the bi-directional transducer may convert the acoustic wave to a frequency modulated electronic signal. Preferably the frequency and power characteristics of bi-directional transducer 140 match the characteristics of the bi-directional transducer 130 from which the wave emanates. The bi-directional converter 150, which may be a signal processor that utilizes a controlled oscillator, converts the electronic signal into a radio frequency signal which is then fed to the transceiver 160. The transceiver 160 receives and transmits the signal via antenna 165.

The arrangement 100 requires proper alignment of the first bi-directional unit 101 with respect to the second bi-directional unit 102. Therefore, the units 101 and 102 are positioned on respective sides of the bulkhead wall 175 so that they have matching horizontal and vertical coordinates. In particular, the transducers 130 and 140 must align to maximize the transmission and reception of the energy forms through the wall. In some instances when propagating acoustic waves, one of the two units (101, 102) may be rotated orthogonally to reduce the ill effects of wave reflection, while maintaining the horizontal and vertical coordinate positions of both units.

Because the arrangement 100 is bi-directional, radio frequency signals received by the second bi-directional unit 102 may be transmitted through the bulkhead wall 175 to the first bi-directional unit 101. Therefore, radio frequency signals received by the transceiver 160 via the associated antenna 165 are sent to the bi-directional converter 150, which converts the radio frequency signal into an electronic signal. The electronic signal is then fed to the bi-directional transducer 140, which converts the signal into an energy form that is propagated through the bulkhead wall 175, with the bulkhead wall conducting the energy form from the second side 179 of the wall to the first side 177 of the wall. The bi-directional transducer 130 on the first side of the wall converts the energy form into and electronic signal and sends this signal to the bi-directional converter 120. The converter 120 converts the electronic signal into a radio frequency signal, which is then received and transmitted by the transceiver 110, via the antenna 105. The electronic signals and the energy forms may take the form of the signals and energy forms as outlined above in the exemplary operation regarding the transmission of signals from the first compartment 10 to the second compartment 20. In the above-described manner, radio frequency signals, and information carried by these signals, may be transmitted across bulkhead walls in either direction.

Figure 2A:
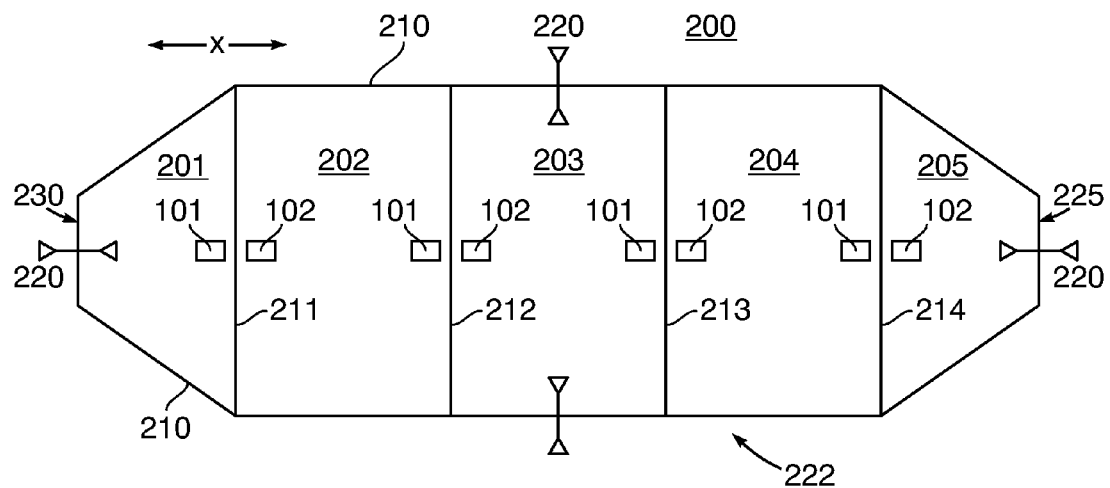
FIG. 2A is a perspective view of a through-the-bulkhead repeater system in a water vessel according to an embodiment of the invention.

FIG. 2A is a perspective view of a through-the-bulkhead repeater system 200 in a water vessel 222 according to an embodiment of the invention. As illustrated, the water vessel includes a hull frame 210 having an aft end 225 and a forward end 230. The vessel body 210 is separated into bulkhead compartments 201, 202, 203, 204, and 205. The bulkhead compartments are separated by bulkhead walls 175, which as illustrated are substantially parallel to each other, and oriented substantially perpendicular to the aft-to-forward direction X of the water vessel. Alternatively, the bulkhead compartments may be separated by walls that are parallel to the aft-to-forward direction X. In some embodiments, the walls may not be parallel to each other, and therefore may be formed at angles that vary with respect to direction X. Additionally, although FIG. 2A shows 5 compartments, the invention the vessel may of system 200 may have as many compartments as desired. The bulkhead compartments illustrated may be above or below the waterline. As outlined with respect to the illustration in FIG. 1, the bulkhead wall 175 may be thick and may comprise a metal such as steel, but other materials may also be used.

As shown in FIG. 2A, the system 200 includes a series of bi-directional through-the-bulkhead repeater arrangements 100. Each arrangement 100 is associated with one of the plurality of bulkhead walls 175, and each arrangement having a first bi-directional unit 101 and a second bi-directional unit 102. As outlined with respect to FIG. 1, each bi-directional unit may be a single package formed on an integrated circuit board or the like. Each unit (101, 102) includes a transceiver, a bi-directional converter, and a bi-directional transducer. The numbering of the elements of the first and second bi-directional units 101 and 102 is consistent with the description of the embodiment of FIG. 1. As illustrated in FIG. 2A, each compartment includes at least one bi-directional unit, with central compartments 202, 203, and 204 having two bi-directional units, with each of the two bi-directional units associated with an independent repeater arrangement 100. As outlined above with respect to the embodiment of FIG. 1, bi-directional units of the same arrangement communicate with each other by my means of transmitting and receiving energy forms that are propagated through the bulkhead walls 175. The energy forms may for example be acoustic waves such as ultrasonic waves. As will be explained below, bi-directional units within the same compartment are configured to communicate with each other by transmitting and receiving radio frequency signals.

In one exemplary operation, a radio frequency signal may originate from a source external to the water vessel. The radio frequency signal may be initially received at the forward end 230 by the antenna 105 of the first bi-directional unit 101 located in compartment 201. Alternatively, the radio frequency signal may be received by the antenna 105, via one of a plurality of relaying transceivers 220. Transceivers 220 may be mounted partially inside the hull frame 210 in compartment 201 for example, allowing the transceiver to capture radio frequency signals from an external source via an external antenna, and to transmit the signal from within the compartment via an internal antenna, or via hard wiring inside the compartment.

According to the exemplary operation, after the signal is received in compartment 201, the signal is transmitted to the adjacent compartment 202 by the exemplary operation outlined with respect to FIG. 1. More specifically, the transceiver 110, which is attached to antenna 105, sends the radio frequency signal to the bi-directional converter 120, which converts the signal to a digital signal, which is then fed to the bi-directional transceiver 130. The transceiver 130 converts the signal to an energy form, which is then propagated through the wall 211. The bi-directional transducer 140 of the second bi-directional unit 102 in compartment 202 receives the energy form, which it converts to a digital signal and sends the digital signal to the bi-directional converter 150 which changes the digital signal to a radio frequency signal which is sent to the transceiver 160. As outlined above with respect to FIG. 1, the electronic signal is preferably an acoustic signal such as an ultrasonic signal. The electronic signal may also be a magnetic signal such as an electromagnetic signal. Additionally, the energy form propagated through the wall 211 may be an acoustic wave such as an ultrasonic wave, or a magnetic wave.

According to the exemplary operation, the transceiver 160 transmits the radio frequency signal via the associated antenna 165. The signal is received within compartment 202 by the antenna 105 of transceiver 110 of the first bi-directional unit 101, which is associated with wall 212. In accordance with the above outlined operation, the radio frequency signal is further transmitted through wall 212 to the second bi-directional unit 102 of compartment 203. This operation, i.e., the in-compartment transfer of the radio frequency signal from the second bi-directional unit 102 to the first bi-directional 101, followed by the transmittal through the wall of the converted radio frequency signal, is repeated several times. This enables the transmittal of the radio frequency signal throughout the length of the vessel, i.e., from the forward end 230 to the aft end 225 through the bulkhead walls 211, 212, 213, and 214, and through compartments 201, 202, 203, 204, and 205. According to the exemplary operation, the transmitted radio frequency signal may be transmitted from compartment 205 to another place, such as a remote location.

Because the system 200 of FIG. 2A is bi-directional, radio frequency signals initially received at the aft end 225 of the water vessel may be transmitted to the forward end 230, through bulkhead walls 214, 213, 212, and 211, through the compartments 205, 204, 204, 202, and 201. Additionally, each of the compartments may carry machines, cargo, electronic equipment and the like, from which radio frequency signals emanate. Consequently, radio frequency signals may originate from within any of the bulkhead compartments 201, 202, 203, 204, and 205, the signals then relayed to other compartments by means of the outlined operation.

Figure 2B:
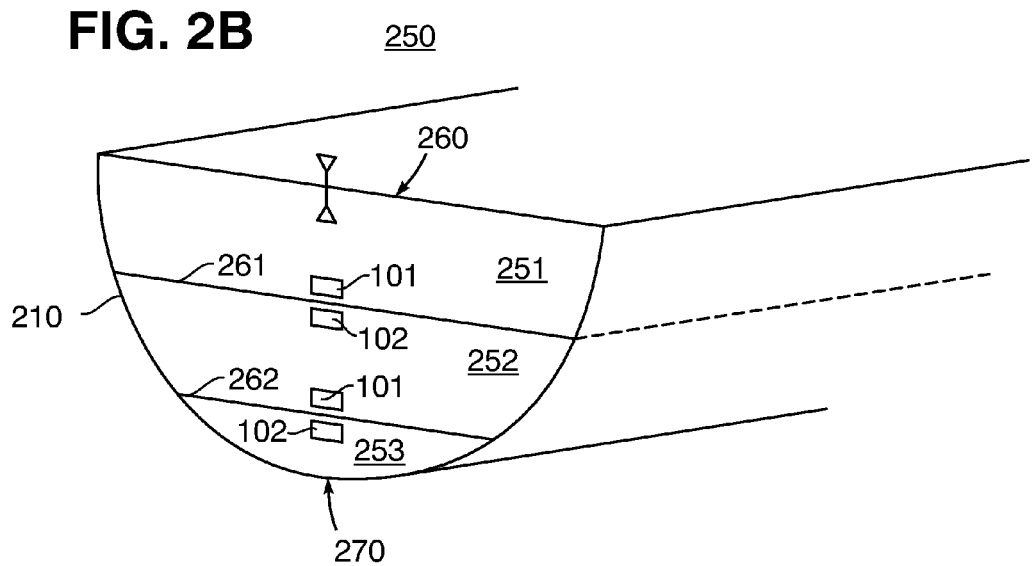
FIG. 2B is a perspective sectional view of a through-the-bulkhead repeater system in a water vessel according to an embodiment of the invention.

FIG. 2B is a perspective sectional view of a through-the-bulkhead repeater system 250 in a water vessel according to an embodiment of the invention. FIG. 2B shows the water vessel having a hull frame 210 having a deck end 260 and a keel end 270, with three vertically stacked compartments (251, 252, 253) positioned between the deck end and the keel end. As shown, the compartments are separated by substantially horizontal bulkhead walls 261 and 262. Bulkhead wall 261 separates topmost compartment 251 from middle compartment 252. Bulkhead wall 262 separates middle compartment 252 from bottommost compartment 253. Although the repeater system 250 shows three vertically stacked compartments, the system may include as many compartments as desired.

FIG. 2B further illustrates bi-directional units 101 and 102 for transmitting radio frequency through the vertically stacked bulkhead compartments. As outlined with respect to FIGS. 1 and 2A, each bi-directional unit may be a single package formed on an integrated circuit board or the like. Each unit (101, 102) includes a transceiver, a bi-directional converter, and a bi-directional transducer. In an operation similar to that outlined with respect to FIG. 2A, radio frequency signals may be transmitted in both directions between the deck end 260 and the keel end 270, through the compartments 251, 252, and 253 by converting the signals into an energy form and propagating the energy forms through the bulkhead walls 261 and 262, and ultimately re-converting the energy forms into radio frequency signals.

Figure 3A:
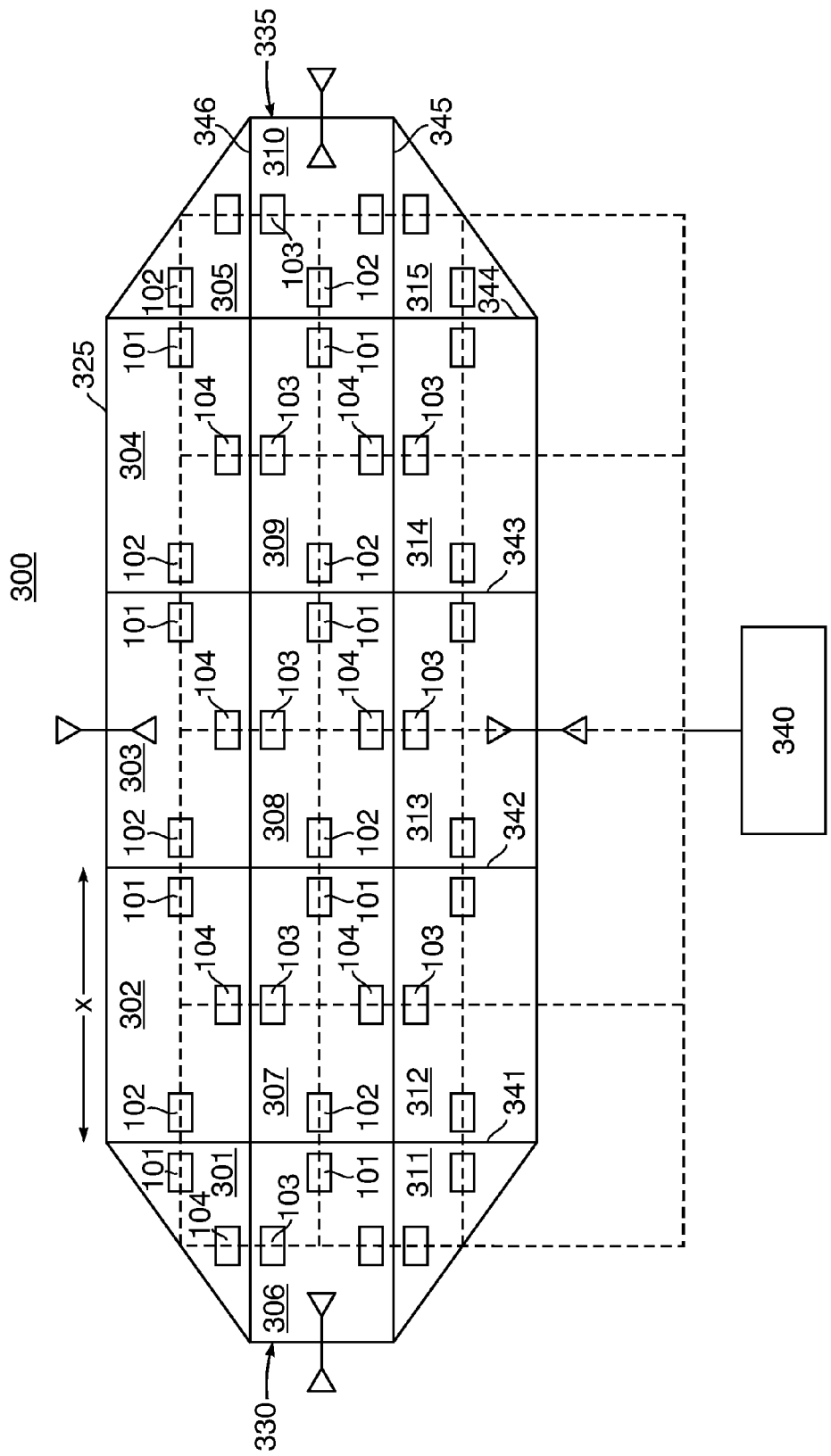
FIG. 3A is a perspective sectional view of a through-the-bulkhead repeater system in a water vessel according to an embodiment of the invention.

FIG. 3A is a perspective sectional view of a through-the-bulkhead repeater system 300 in a water vessel according to an embodiment of the invention. As shown in FIG. 3A, system 300 includes a water vessel 333 having a hull frame 325 with a forward end 330 and an aft end 335. The vessel includes fifteen compartments numbered consecutively from 301 to 315. The fifteen compartments are separated by bulkhead walls 341, 342, 343, 344, 345, and 346, with bulkhead walls 341, 342, 343, and 344 running in a forward-to-aft direction, and bulkhead walls 345 and 346 running substantially perpendicular to the other walls, which results in a grid-like arrangement of compartments. The compartments may be above or below the waterline. It should be noted that in the bulkhead repeater system 300, other compartment arrangements may be may be implemented. For example, the arrangement may include more than fifteen compartments or less than fifteen compartments. The compartments may not necessarily be rectangular as illustrated, and may not be necessarily aligned in rows and/or columns.

In the illustration, each compartment has between two and four bi-directional units, numbered 101, 102, 103, and 104. As outlined with respect to FIGS. 1, 2A, and 2B, each bi-directional unit is a single package formed on an integrated circuit board or the like. Each unit (101, 102, 103, and 104) includes a transceiver, a bi-directional converter, and a bi-directional transducer. As shown, paired bi-directional units 101 and 102 are aligned on opposite sides of bulkhead walls 341, 342, 343, and 344, in adjacent compartments, to enable the transmission of radio frequency signals in the forward-to-aft and aft-to-forward direction X. For example, in an operation as outlined with respect to FIG. 1, unit 101 in compartment 306 on a first side of wall 341 communicates with unit 102 in compartment 307 on the second side of wall 341. FIG. 3A also shows paired bi-directional units 103 and 104 aligned on opposite sides of bulkhead walls 345 and 346, in adjacent compartments, to enable the transmission of radio frequency signals in a direction substantially perpendicular to direction X. For example, in an operation as outlined with respect to FIG. 1, unit 103 in compartment 306 on a first side of wall 346 communicates with unit 104 in compartment 301 on the second side of wall 346. Additionally, each bi-directional unit is capable of communicating with another bi-directional unit within the same compartment. For example, compartment 308 has bi-directional units 101, 102, 103, and 104. As will be explained below, each of these units may communicate with each other via the transmittal and reception of radio frequency signals within the compartment.

FIG. 3A further illustrates a controller 340, which controls the operations of the water vessel 333 including the operation of bi-directional units 101, 102, 103, and 104. With respect to the controlling of the bi-directional units, the controller 340 decides the path of signals through the plurality of compartments and bulkhead walls in the water vessel 333. For example, in the transmission of signals from forward end 330 to a compartment at the aft end 335, the controller 340 may direct the bi-directional units to transmit the signals along the shortest path or most direct route. Alternatively, the controller 340 may circumvent particular compartments, if passage through said compartments may be detrimental to the proper transmission of the signals. For example if a particular compartment contains a nuclear reactor that interferes with the transmitted signal, that compartment would be avoided, even if that compartment represents the most direct path for the transmission of the signal.

Within a particular compartment, the transmission of radio frequency signals from unit to unit may be achieved by known means. For example, in order to accommodate the transmission of radio frequency signals in different directions, each bi-directional unit in each compartment may be equipped with a frequency modulator that modulates the output frequency of the radio frequency signals. Additionally, the receiving antenna of each bi-directional unit is responsive only to radio frequency signals of a particular frequency band. Therefore, radio frequency signals can be directed to a desired bi-directional unit by transmitting radio frequency signals in a frequency band that can only be received by the desired bi-directional unit. In one exemplary operation, the bi-directional unit 102 in compartment 307 shown in FIG. 3A, receives a radio frequency signal and related information from the bi-directional unit 101 of compartment 306, in a manner as outlined with respect to the embodiment of FIG. 1. In this exemplary operation, the bi-directional unit 102 in compartment 307 has the capability to transmit the radio frequency signal and the related information to one of three other bi-directional units (101, 103, and 104) within compartment 307. If the controller 340 decides that the signal should be transmitted from compartment 307 to the adjacent compartment 312, then within compartment 307, the radio frequency signal would be transmitted from bi-directional unit 102 to bi-directional unit 104. In order to direct the signal from unit 102 to unit 104, the frequency modulator in unit 102 modulates the output radio frequency signal into a frequency band that can only be received by bi-directional unit 104. After the bi-directional unit 104 receives the radio frequency signal, the unit transmits the signal to compartment 312 through bulkhead wall 345, in a manner as outlined with respect to the embodiment of FIG. 1.

Figure 3B:
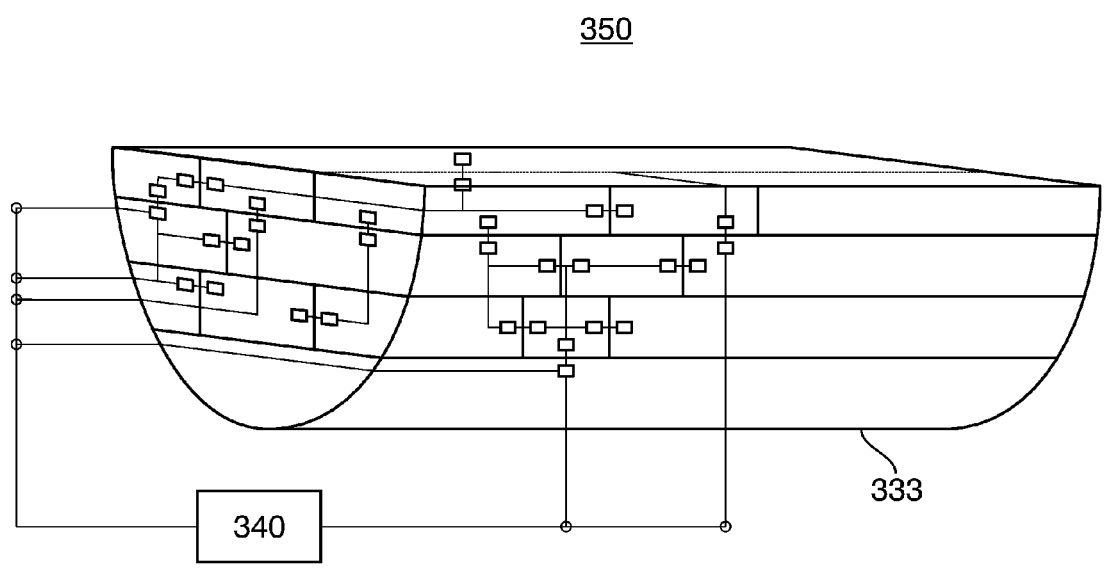
FIG. 3B is a general perspective sectional view of a through-the-bulkhead repeater system in a water vessel having horizontally and vertically arranged compartments, according to an embodiment of the invention.

Although FIG. 3A shows compartments on a similar horizontal level, the system of selective transmission as outlined is applicable to a matrix of compartments that are arranged in different horizontal and vertical schemes. FIG. 3B is a general perspective view of a through-the-bulkhead repeater system 350 in a water vessel 333, the water vessel having horizontally and vertically arranged compartments. FIG. 3B shows the vessel having compartments on different deck levels. It should be noted that the arrangement 350 may have as many deck levels as desired. The selective transmission of radio frequency signals outlined with respect to FIG. 3A is also applicable to FIG. 3B. In directing a radio frequency signal through the water vessel 333 of FIG. 3B, the controller 340 may direct a signal form one compartment to an adjacent compartment on the same deck level, or to a compartment at an upper level, or to a compartment at a lower level. To enable the transmission of radio frequency signals to these different possible locations, each compartment may have six bi-directional units, the units operating in a manner similar to the manner described with respect to FIG. 3A.

The bi-directional units of each embodiment may be powered by batteries or by energy harvesting devices. Batteries may be used to provide a stable and reliable power source. However energy harvesting devices that utilize environmental conditions such as light or vibrations can provide a more dynamic power source. The bi-directional units may also be powered by hybrid devices that utilize batteries as well as energy harvesting devices.

Figure 4:
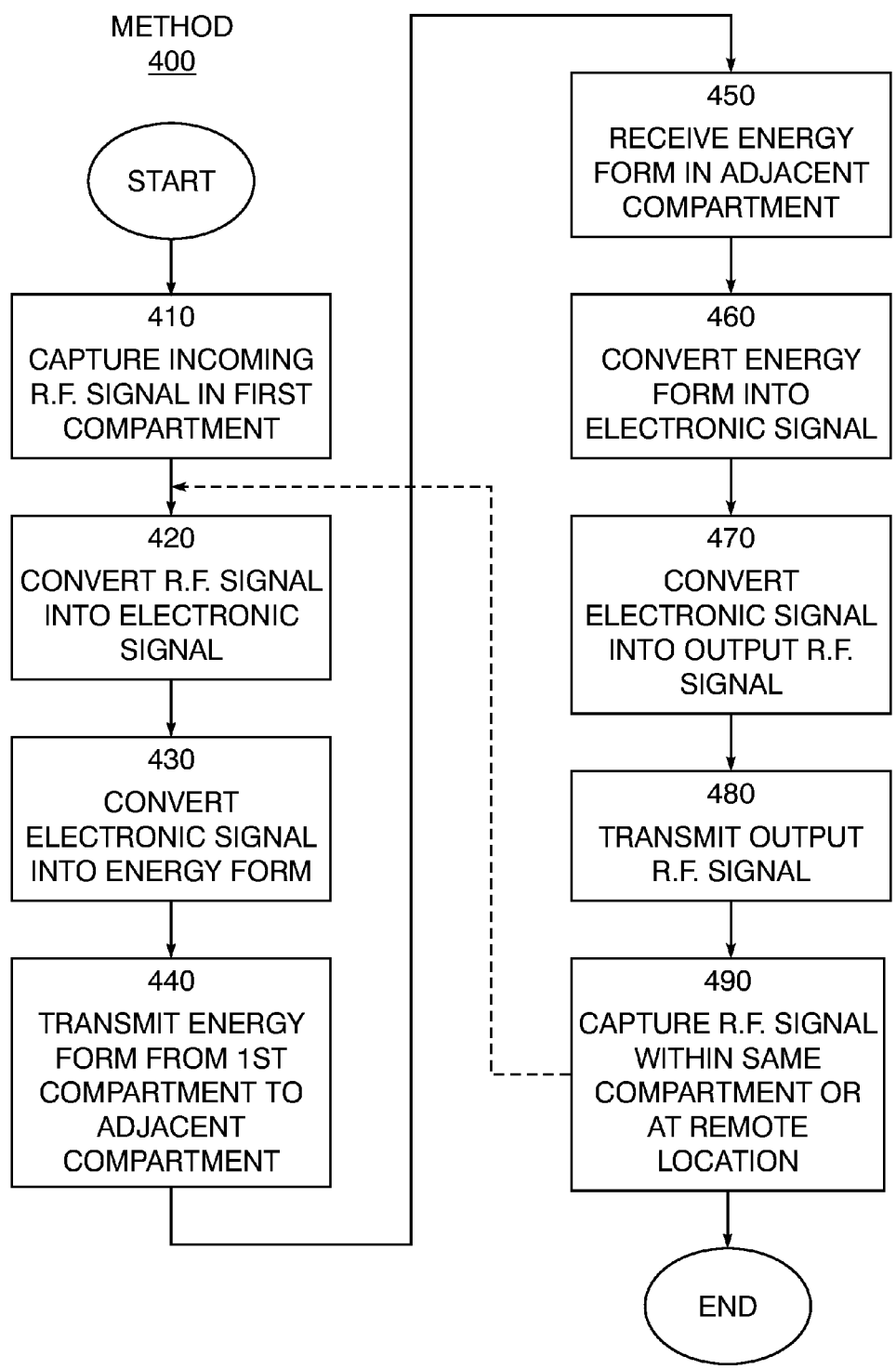
FIG. 4 is a flow chart of a method of transmitting radio frequency signals throughout a water vessel, according to an embodiment of the invention.

FIG. 4 illustrates a method 400 of transmitting radio frequency signals and associated information through a water vessel according to an embodiment of the invention. As illustrated in FIGS. 2A, 2B, 3A, and 3B, the vessel includes a vessel hull having a plurality of adjacently situated bulkhead compartments. The vessel hull is also equipped with one or more bi-directional units in each compartment. As shown in FIG. 1, each bi-directional unit has a transceiver and associated antenna, a bi-directional converter, and a bi-directional transducer.

Step 410 is the capturing of a radio frequency signal in a first compartment of one of the plurality of compartments. The radio frequency signal may originate from outside or inside the compartment. A bi-directional unit of the one or more bi-directional units in the first compartment processes the radio frequency signal. The antenna and associated transceiver of the unit, captures the radio frequency signal. Step 420 is the converting of the radio frequency signal into an electronic signal. The transceiver of the bi-directional unit sends the radio frequency signal to the bi-directional converter, which converts the radio frequency signal to the electronic signal, which is then sent to the bi-directional transducer. The electronic signal is preferably an acoustic signal such as an ultrasonic signal. The electronic signal may also be a magnetic signal such as an electromagnetic signal.

Step 430 is the converting of the electronic signal into an energy form, which is performed by the bi-directional transducer of the unit. As stated above, the energy form may be an acoustic wave such as ultrasonic wave, or a magnetic wave. The electronic signal may be an acoustic signal such as an ultrasonic signal or may be a magnetic signal. Step 440 is the transmitting of the energy form from the first compartment into an adjacent compartment. The bi-directional transducer propagates the energy form through the bulkhead wall. As stated above, the energy form may be an acoustic wave such as an ultrasonic wave, or a magnetic wave. According to this process, the bulkhead wall acts as a conductor.

Step 450 is the receiving of the energy form at the opposite side of the bulkhead wall in the adjacent compartment. A bi-directional unit of the one or more bi-directional units in the adjacent compartment detects and processes the energy form. A bi-directional transducer in the bi-directional unit in the adjacent compartment detects the energy form. As stated above, the energy form may be an acoustic wave such as an ultrasonic wave, or may also be a magnetic wave. At step 460, the bi-directional transducer converts the energy form into an electronic signal. Again as stated above, the electronic signal may be an acoustic signal such as an ultrasonic signal, or the signal may also be a magnetic signal. At step 470, the bi-directional converter converts the electronic signal into an output radio frequency signal. Step 480 is the transmitting of the output radio frequency signal. The transceiver receives the converted radio frequency signal from the bi-directional converter. The transceiver then transmits the output radio frequency signal via the associated antenna.

Step 490 is the receiving of the output radio frequency signal within the same compartment from which the output signal was transmitted. An antenna of another bi-directional unit located within compartment receives the signal. The entire process may be repeated to continue the propagation of the radio frequency signal and related information, from compartment to compartment through the various bulkhead walls. Additionally, in compartments having more than two bi-directional units, output frequencies may be modulated to a predetermined frequency band so that only a predetermined bi-directional unit of the two or more bi-directional units receives the radio frequency signal. Alternatively, at step 490, the output signal may be captured at a location remote to the water vessel wherein the process ends.

A number of exemplary implementations have been described. Nevertheless, it will be understood that various modifications may be made. For example, suitable results may be achieved if the steps of described techniques are performed in a different order and/or if components in a described component, system, architecture, or devices are combined in a different manner and/or replaced or supplemented by other components. Accordingly, other implementations are within the scope of the following claims.

What is claimed is:

1. A through the bulkhead repeater arrangement, the arrangement comprising:
   at least one bulkhead wall having a first side and a second side, with a first bi-directional unit associated with the first side of the bulkhead wall for receiving a radio frequency signal, the first bi-directional unit comprising:
   a first antenna;
   a first transceiver electrically attached to the first antenna, wherein the first transceiver receives radio frequency signals via the first antenna;
   a first bi-directional converter electrically attached to the first transceiver, wherein the first bi-directional converter converts radio frequency signals sent by the first transceiver into electronic signals;
   a first bi-directional transducer electrically attached to the first bi-directional converter, wherein the first bi-directional transducer receives the electronic signals from the first bi-directional converter and converts the electronic signals into an energy form and propagates said energy form through the bulkhead wall from the first side of the bulkhead wall to the second side of the bulkhead wall, using the bulkhead wall as a conductor;

the through the bulkhead repeater arrangement further comprising a second bi-directional unit associated with the second side of the bulkhead wall for transmitting a radio frequency signal, the second bi-directional unit comprising:
  a second bi-directional transducer, the second bi-directional transducer receives said energy form, and converts said energy form into electronic signals, the second bi-directional transducer transmitting said electronic signals;
  a second bi-directional converter electrically connected to the second bi-directional transducer, wherein the second bi-directional converter receives the electronic signals from the second bi-directional transducer and converts the electronic signals into radio frequency signals; and
  a second transceiver having a second antenna, the second transceiver electrically attached to the second bi-directional converter, wherein the second transceiver receives the radio frequency signals from the second bi-directional converter, and transmits said radio frequency signals via the second antenna.

2. The through the bulkhead repeater arrangement of claim 1, wherein the first antenna, the first transceiver, the first bi-directional converter, and the first bi-directional transducer are all provided on a single board in a single package, and wherein the second antenna, the second transceiver, the second bi-directional converter, and the second bi-directional transducer are all provided on a single board in a second package, and wherein the first bi-directional unit and the second bi-directional unit are mounted on first and second sides of the bulkhead wall respectively, the first bi-directional unit and the second bi-directional unit mounted in matching horizontal and vertical orientations to properly align the transducers to maximize communication between the transducers.

3. The through the bulkhead repeater arrangement of claim 2, wherein the first bi-directional converter is a signal processor that converts radio frequency signals into acoustic signals, and the first bi-directional transducer converts the acoustic signals into acoustic waves that are propagated through the bulkhead wall.

4. The through the bulkhead repeater arrangement of claim 3, wherein the second bi-directional transducer converts the acoustic waves into acoustic signals and the second bi-directional converter is a signal processor that converts the acoustic signals propagated by the second bi-directional transducer into radio frequency signals.

5. The through the bulkhead repeater arrangement of claim 4, wherein the first bi-directional unit mounted on the first side of the bulkhead for receiving radio frequency signals is also a transmitting unit, wherein the first bi-directional transducer is also a receiving transducer for receiving acoustic waves from the second bi-directional transducer and for converting said acoustic waves to acoustic signals; and wherein the first bi-directional converter is electrically attached to the first bi-directional transducer to receive the acoustic signals sent by the first bi-directional transducer, to convert the acoustic signals into radio frequency signals; and wherein the first transceiver on the first side of the wall is electrically attached to the first bi-directional converter to receive and transmit the electronic signals via the first antenna.

6. The through the bulkhead repeater arrangement of claim 5, wherein the second bi-directional unit mounted on the second side of the bulkhead for transmitting radio frequency signals is also a receiving unit, wherein the second transceiver receives radio frequency signals via the second antenna, the second transceiver electrically connected to the second bi-directional converter, the second bi-directional converter for receiving the radio frequency signals from the second transceiver to convert said signals into acoustic signals, wherein the second bi-directional transducer is configured to receive the acoustic signals from the second bi-directional converter to convert the signals into acoustic waves to be transmitted to the first transceiver of the first bi-directional unit.

7. The through the bulkhead repeater arrangement of claim 6, wherein the acoustic signals transmitted by the first bi-directional converter to the first bi-directional transducer, and the acoustic signals transmitted by the second bi-directional transducer to the second bi-directional converter are ultrasonic signals, and wherein the acoustic waves transmitted by the first bi-directional transducer and the second bi-directional transducer are ultrasonic waves.

8. A water vessel bulkhead repeater system for transmitting radio frequency signals throughout the water vessel, the system comprising:
  a vessel hull having a plurality of bulkhead compartments, each compartment arranged adjacent to at least one other compartment, each compartment comprising a plurality of bulkhead walls with one or more of said plurality of bulkhead walls separating adjacent compartments from each other, each bulkhead wall having two opposing sides, each said compartment comprising:
  at least one bi-directional unit mounted on a side of a bulkhead wall within said compartment, said at least one bi-directional unit comprising:
    an antenna;
    a transceiver electrically connected to the antenna, the transceiver for receiving incoming radio frequency signals via the antenna;
    a bi-directional converter electrically attached to the transceiver, the bi-directional converter for receiving incoming radio frequency signals from the transceiver and for converting the radio frequency signals into electronic signals,
    a bi-directional transducer electrically connected to the bi-directional converter for receiving the electronic signals from the bi-directional transducer, and for converting the signals to an energy form, the bi-directional transducer propagating the energy form through the bulkhead wall to an adjacent bulkhead compartment.

9. The water vessel bulkhead repeater system of claim 8, wherein in the at least one bi-directional unit, the bi-directional transducer is further configured to receive an energy form from an adjacent compartment, and to convert said energy form into an electronic signal, and the bi-directional converter is further configured to receive said electronic signal from the bi-directional transducer and convert the electronic signal into a radio frequency signal, and the transceiver is further configured to receive the radio frequency signal from the bi-directional converter and transmit the radio frequency signal as an output radio frequency signal, via the antenna.

10. The water vessel bulkhead repeater system of claim 9, wherein the antenna, the transceiver, the bi-directional converter, and the bi-directional transducer of the at least one bi-directional unit are all provided on a single circuit board in a single package.

11. The water vessel bulkhead repeater system of claim 10, wherein the at least one bi-directional unit in each compartment comprises two or more bi-directional units, each of the two or more units associated with a different bulkhead wall within the compartment, each of the two or more bi-directional units communicating with, and vertically and horizontally aligned with, another bi-directional unit on an opposite side of the bulkhead wall in an adjacent compartment.

12. The water vessel bulkhead repeater system of claim 11, further comprising a controller for selectively controlling the transmission path of the radio frequency signals throughout the water vessel, wherein each bi-directional unit in each bulkhead compartment further comprises a frequency modulator, the frequency modulator controlled by the controller, the frequency modulator configured to regulate an output radio frequency range, said output radio frequency range compatible with another transceiver of said two or more bi-directional units in the bulkhead compartment, wherein only a compatible transceiver can receive the output radio frequency signals within said frequency range.

13. The water vessel bulkhead repeater system of claim 12, wherein in each bi-directional unit the electronic signals produced by the bi-directional converter are acoustic signals, and the energy form produced by the bi-directional transducer comprises acoustic waves.

14. The water vessel bulkhead repeater system of claim 13, wherein the acoustic signals are ultrasonic signals, and the acoustic waves are ultrasonic waves.

15. The water vessel bulkhead repeater system of claim 12, wherein in each bi-directional unit the electronic signals produced by the bi-directional converter are magnetic signals, and the energy form produced by the bi-directional transducer comprises magnetic energy.

16. A method of transmitting radio frequency signals throughout a water vessel, the water vessel having a vessel hull having a plurality of bulkhead compartments, each compartment arranged adjacent to at least one other compartment, each compartment comprising a plurality of bulkhead walls with one or more of said plurality of bulkhead walls separating adjacent compartments from each other, each bulkhead wall having opposite sides located in adjacent compartments, the method comprising:

(a) capturing an incoming radio frequency signal in a first compartment of one of said compartments;

(b) converting the radio frequency signal into an electronic signal;

(c) converting the electronic signal into an energy form;

(d) transmitting the energy form from said first compartment into an adjacent compartment by propagating the energy form through the bulkhead wall;

(e) receiving the energy form at the opposite side of the bulkhead wall in said adjacent compartment;

(f) converting the energy form into an electronic signal;

(g) converting the electronic signal into an output radio frequency signal; and (h) transmitting the output radio frequency signal.

17. The method of claim 16, wherein the water vessel further includes:

at least one bi-directional unit within each compartment mounted on a side of the bulkhead wall, each of the at least one bi-directional unit communicating with another of the at least one bi-directional units mounted on an opposite side of the bulkhead wall in an adjacent compartment, each bi-directional unit comprising:

an antenna;
a transceiver electrically connected to the antenna;
a bi-directional converter; and
a bi-directional transducer;

wherein in (a)-(d), in said at least one bi-directional unit in said first compartment, the transceiver captures the incoming radio frequency signal via the antenna, the bi-directional converter converts the radio frequency signal to the electronic signal, and the bi-directional transducer converts the electronic signal into the energy form and propagates the energy form through the bulkhead wall, and wherein in (e)-(h), in said at least one bi-directional unit in said adjacent compartment, the bi-directional transducer receives the energy form, and converts the energy form into the electronic signal, the bi-directional converter converts the electronic signal into the radio frequency signal, and the transceiver receives and transmits the output radio frequency signal, via the antenna.

18. The method of claim 17, wherein the at least one bi-directional unit in each compartment is two or more bi-directional units, the method further comprising:

capturing in said adjacent compartment, the output radio frequency signal with another of said two or more bi-directional units;

repeating (b)-(h) for transmitting the radio frequency signal from said adjacent compartment through a bulkhead wall to another adjacent compartment.

19. The method of claim 18, further including the modulating of the output radio frequency signal to a predetermined frequency band so that only a predetermined bi-directional unit of said two or more bi-directional units receives the output radio frequency signal.

20. The method of claim 19, wherein in (a)-(h), the electronic signal is an ultrasonic signal, and the energy form comprises ultrasonic waves.

* * * * *